(12) United States Patent
Maekawa et al.

(10) Patent No.: US 7,193,862 B2
(45) Date of Patent: Mar. 20, 2007

(54) CERAMIC LAMINATED DEVICE, COMMUNICATION EQUIPMENT AND METHOD OF MANUFACTURING CERAMIC LAMINATED DEVICE

(75) Inventors: Tomoya Maekawa, Nara (JP); Hiroshi Shigemura, Kyoto (JP); Fumihiko Taniguchi, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 359 days.

(21) Appl. No.: 10/441,382

(22) Filed: May 20, 2003

(65) Prior Publication Data

US 2004/0055693 A1    Mar. 25, 2004

(30) Foreign Application Priority Data

May 22, 2002    (JP)    ............................. 2002-148220

(51) Int. Cl.
*H05K 1/11*    (2006.01)
(52) U.S. Cl. ........................................ 361/795; 174/255
(58) Field of Classification Search ............... 361/760; 333/204
See application file for complete search history.

(56) References Cited

U.S. PATENT DOCUMENTS

| | | | | | |
|---|---|---|---|---|---|
| 5,892,415 | A | * | 4/1999 | Okamura | 333/175 |
| 6,140,891 | A | * | 10/2000 | Nakakubo et al. | 333/204 |
| 6,346,866 | B2 | * | 2/2002 | Nakakubo et al. | 333/204 |
| 6,753,070 | B2 | * | 6/2004 | Mori et al. | 428/209 |
| 6,784,765 | B2 | * | 8/2004 | Yamada et al. | 333/193 |

FOREIGN PATENT DOCUMENTS

JP    10-303068    11/1998

* cited by examiner

*Primary Examiner*—Dean A. Reichard
*Assistant Examiner*—Ivan Carpio
(74) *Attorney, Agent, or Firm*—RatnerPrestia

(57) ABSTRACT

In recent years, ceramic laminated devices are becoming a focus of great attention as considerable contribution to the miniaturization of high frequency wireless equipment such as a cellular phone, but it is difficult for the conventional ceramic laminated device to secure reliability while maintaining favorable high frequency characteristics. The present invention provides a ceramic laminated device including a reinforcement electrode, which is formed inside a laminated body in which a plurality of ceramic layers, a plurality of inner electrodes and inter-layer via holes are stacked, not electrically connected with inner electrodes nor inter-layer via holes but mechanically connected with the ceramic layers.

14 Claims, 11 Drawing Sheets

CERAMIC LAMINATED DEVICE, COMMUNICATION EQUIPMENT AND METHOD OF MANUFACTURING CERAMIC LAMINATED DEVICE

BACKGROUND OF THE INVENTION

1. Field of the Invention

The present invention relates to a ceramic laminated device used for high frequency wireless equipment such as cellular phone, communication equipment, and method of manufacturing the ceramic laminated device.

2. Related Art of the Invention

In recent years, ceramic laminated devices are becoming a focus of great attention as considerable contribution to the miniaturization of high frequency wireless equipment such as cellular phones.

A configuration of a conventional ceramic laminated device used for high frequency wireless equipment (e.g., Japanese Patent Laid-Open No. 10-303068) will be explained with reference to FIG. 13.

The disclosure of Japanese Patent Laid-Open No. 10-303068 is incorporated herein by reference in its entirety.

FIG. 13 is a schematic perspective view of a conventional ceramic laminated device.

The conventional ceramic laminated device has a structure with ceramic layers 61 and electrode patterns 62 alternately stacked.

The electrode patterns 62 built in a laminated body 63 constitute a high frequency circuit and are mutually electrically connected by means of inter-layer via holes 64.

Furthermore, shield electrodes 65a and 65b are formed on the top and bottom surfaces of the laminated body 63 to keep it shielded from the outside.

Furthermore, end electrodes 66a and 66b are electrically connected with the shield electrodes 65a and 65b to form grounding terminals, and terminal electrodes 67a and 67b form input/output terminals for inputting/outputting electric signals to/from the outside are formed on the right and left end faces of the laminated body 63.

The conventional ceramic laminated device in the above-described configuration is mounted on a printed circuit board by soldering a grounding electrode (not shown) to the end electrodes 66a and 66b and soldering a high frequency signal electrode (not shown) drawn on the printed circuit board to the terminal electrodes 67a and 67b.

However, such a configuration of the conventional ceramic laminated device generally has small folding resistance of low temperature sintered ceramic used as the ceramic layer 61. This reduces the strength of bonding by sintering between the ceramic layer 61, end electrodes 66a and 66b and terminal electrodes 67a and 67b.

As a result, when a reliability test (especially, drop test) is conducted after the mounting on the printed circuit board, (1) the laminated body 63 may be peeled off the printed circuit board or (2) cracks may occur near joints between the printed circuit board, end electrodes 66a and 66b and terminal electrodes 67a and 67b.

Furthermore, for the conventional ceramic laminated device, when a semiconductor element (semiconductor bare chip) SAW filter, discrete component, etc. are soldered to the shield electrode 65b which is formed on the laminated body 63, solder joints may be weakened.

Thus, for the conventional ceramic laminated device, it is difficult to secure reliability while maintaining favorable high frequency characteristics.

SUMMARY OF THE INVENTION

The present invention has been implemented in view of the above-described conventional problems and it is an object of the present invention to provide a ceramic laminated device, communication equipment and method of manufacturing the ceramic laminated device capable of securing reliability while maintaining favorable high frequency characteristics.

The $1^{st}$ aspect of the present invention is a ceramic laminated device comprising an inner part formed inside a laminated body in which a plurality of ceramic layers (see FIG. 1) and a plurality of electrode layers are stacked, wherein said inner part is not electrically connected with said electrode layers but mechanically connected with said ceramic layer.

The $2^{nd}$ aspect of the present invention is the ceramic laminated device according to the $1^{st}$ aspect, wherein said inner part is a single or a plurality of plane type inner parts provided substantially in parallel to said ceramic layer.

The $3^{rd}$ aspect of the present invention is the ceramic laminated device according to the $2^{nd}$ aspect, further comprising shield electrodes formed on the upside and/or underside of said laminated body, wherein said plane type inner part has the same shape as that of said shield electrodes.

The $4^{th}$ aspect of the present invention is the ceramic laminated device according to the $2^{nd}$ aspect, further comprising shield electrodes formed on the upside and/or underside of said laminated body, wherein said plane type inner parts have a shape different from that of said shield electrodes.

The $5^{th}$ aspect of the present invention is the ceramic laminated device according to the $1^{st}$ aspect, further comprising shield electrodes formed on the upside and/or underside of said laminated body wherein said inner part is a single or a plurality of solid inner parts provided substantially perpendicular to said ceramic layers on the plane on the side of at least said shield electrodes of said ceramic layers to which said shield electrodes are pasted.

The $6^{th}$ aspect of the present invention is the ceramic laminated device according to the $2^{nd}$ aspect, further comprising shield electrodes formed on the upside and/or underside of said laminated body, wherein said inner parts are (i) said plane type inner parts, and (ii) a single or a plurality of solid inner parts provided substantially perpendicular to said ceramic layers in said ceramic layers between said shield electrodes and said plane type inner parts.

The $7^{th}$ aspect of the present invention is the ceramic laminated device according to the $6^{th}$ aspect, wherein a plurality of said plane type inner parts are provided, at least some of said solid inner parts are provided in said ceramic layer between said plane type inner parts.

The $8^{th}$ aspect of the present invention is the ceramic laminated device according to any one of the $5^{th}$ to the $7^{th}$ aspects, wherein said solid inner part is a via hole filled with a conductive paste or dielectric paste.

The $9^{th}$ aspect of the present invention is a ceramic laminated device comprising:

side electrodes formed on a side of a laminated body in which a plurality of ceramic layers and a plurality of electrode layers are stacked; and an inner part, which is formed inside said laminated body, not electrically connected with said electrode layers but mechanically connected with said side electrodes.

The 10$^{th}$ aspect of the present invention is the ceramic laminated device according to the 9$^{th}$ aspect, wherein said side electrodes are terminal electrodes formed on end faces of said laminated body for. inputting/ outputting electric signals to/from the outside, and said inner part is a plane type inner part mechanically connected with a whole or part of said terminal electrodes and provided substantially in parallel to said ceramic layer.

The 11$^{th}$ aspect of the present invention is the ceramic laminated device according to the 9$^{th}$ aspect, further comprising an upside shield electrode formed on the upside of said laminated body, and an underside shield electrode formed on the underside of said laminated body, wherein said side electrodes are end electrodes formed on end faces of said laminated body for electrically connecting said upside shield electrode and said underside shield electrode, and said inner part is a plane type inner part mechanically connected with a whole or part of said end electrodes and provided substantially in parallel to said ceramic layer.

The 12$^{th}$ aspect of the present invention is the ceramic laminated device according to the 1$^{st}$ or the 9$^{th}$ aspect, wherein a semiconductor element and/or SAW filter are mounted on the upside of said laminated body.

The 13$^{th}$ aspect of the present invention is the ceramic laminated device according to the 1$^{st}$ or the 9$^{th}$ aspect, wherein said laminated body incorporates a filter.

The 14$^{th}$ aspect of the present invention is the ceramic laminated device according to the 13$^{th}$ aspect, wherein said filter has the function as a duplexer having a transmission filter function to transmit signals and a reception filter function to receive signals.

The 15$^{th}$ aspect of the present invention is communication equipment comprising:

communication circuits that carries out a communication using transmission and/or reception of signals; and the ceramic laminated device according to the 1$^{st}$ or the 9$^{th}$ aspect that carries out filtering during said communication.

The 16$^{th}$ aspect of the present invention is a method of manufacturing the ceramic laminated device according to the 1$^{st}$ aspect, comprising an inner part forming step of forming said inner part inside said laminated body in such a way that said inner part is not electrically connected with said electrode layer but mechanically connected with said ceramic layer.

The 17$^{th}$ aspect of the present invention is a method of manufacturing the ceramic laminated device according to the 9$^{th}$ aspect, comprising an inner part forming step of forming said inner part inside said laminated body in such a way that said inner part is not electrically connected with said electrode layers but mechanically connected with said side electrodes.

DESIGNATION OF REFERENCE NUMERALS

Figure 1:
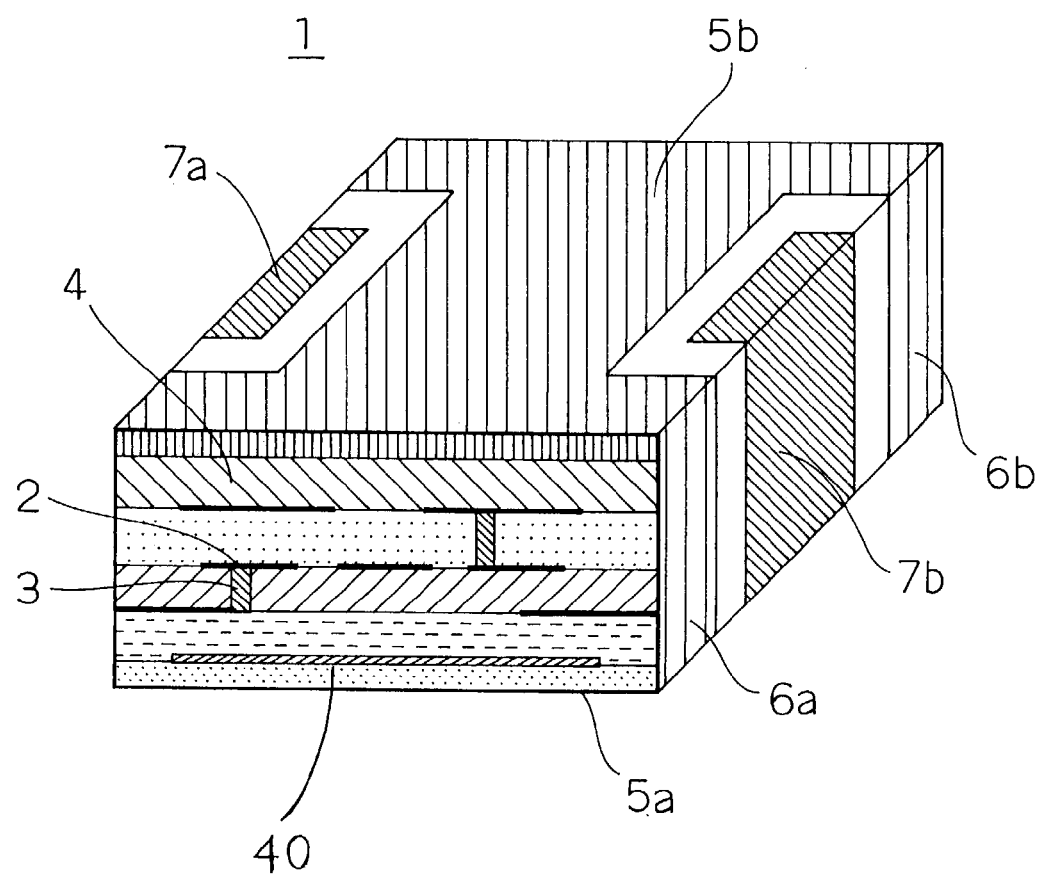
FIG. 1 is a schematic perspective view of a ceramic laminated device according to Embodiment 1 of the present invention.

1 Laminated body
2 Inner electrode
3 Inter-layer via hole
4 Ceramic layer
5a, 5b Shield electrode
6a, 6b End electrodes
7a, 7b Terminal electrode
8 Via hole
11 Laminated body
12 Inner electrode
13 Inter-layer via hole
14a to 14g Ceramic layer
15a, 15b Shield electrode
16 First via hole
17 First via connection electrode
18 Second via hole
19 Second via connection electrode
21 Laminated body
22 Ceramic layer
23 Third via hole
24 Shield electrode
25 Third via connection electrode
31 Ceramic layer
32 Electrode pattern
33 Inter-layer via hole
34a, 34b Shield electrode
35a to 35d End electrode
36a, 36b End electrode
37a, 37b Terminal electrode
38 First inner electrode
39 Second inner electrode
41 Laminated body
42 Semiconductor element
43 SAW filter
44 PIN diode
45 Chip capacitor
46 Chip resistor
51 Baseband section
52 Transmission circuit section 53 Reception circuit section
54 Antenna
55 Duplexer
61 Ceramic layer
62 Electrode pattern
63 Laminated body
64 Inter-layer via hole
65a, 65b Shield electrode
66a, 66b End electrode
67a, 67b Terminal electrode

PREFERRED EMBODIMENTS OF THE INVENTION

With reference to the attached drawings, embodiments of the present invention will be explained below.

(Embodiment 1)

With reference to FIG. 1, the configuration and operation of a ceramic laminated device according to this embodiment will be explained.

In addittion to explaining the configuration and operation of the ceramic laminated device of this embodiment, an embodiment of a method of manufacturing the ceramic laminated device of the present invention will also be explained (the same will apply to other embodiments).

FIG. 1 is a schematic perspective view of the ceramic laminated device according to Embodiment 1 of the present invention.

The ceramic laminated device of this embodiment has a laminated body 1.

Inner electrodes 2 constituting a high frequency circuit are built in the laminated body 1.

The inner electrodes 2 are mutually electrically connected by means of a plurality of inter-layer via holes 3.

Each layer electrode pattern formed inside the laminated body 1 is formed by means of screen printing, for example, using a conductive paste predominantly composed of silver or copper.

The plurality of inter-layer via holes 3 are formed by filling holes penetrating a ceramic layer 4, which constitutes the laminated body 1, with a conductive paste predominantly composed of silver or copper and sintering them.

Shield electrodes 5a and 5b are formed on the top and bottom surfaces of the laminated body 1 to keep it shielded from the outside.

End electrodes 6a and 6b which are electrically connected with the shield electrodes 5a and 5b to form grounding terminals and terminal electrodes 7a and 7b which form input/output terminals for inputting/outputting electric signals to/from the outside are formed on the right and left end faces of the laminated body 1.

A feature of the ceramic laminated device of this embodiment is seen near the bottom of the laminated body 1 of the ceramic layer 4.

More specifically, a reinforcement electrode 40 for reinforcing the contact with the layer right above is placed on the top surface of the bottom layer of the laminated body 1 of the ceramic layer 4.

In this way, it is possible to improve the bonding strength of the ceramic layer 4 constituting the laminated body 1, and it was proved through a reliability test including a drop test that the configuration according to this embodiment had excellent stress resistance and reliability.

(I) By the way, examples of a dielectric material used for the ceramic layer include a low relative dielectric constant ceramic material such as Al—Mg—Si—Gd—O base (relative dielectric constant=7.5), high relative dielectric constant ceramic material such as Bi—Ca—Nb—O base (relative dielectric constant=58) or glass ceramics. However, while any ceramic material that meets the required electrical characteristics can be used, it is preferable to use a ceramic material with large folding resistance wherever possible.

(II) Furthermore, it is also possible to use ceramic materials with different dielectric constants for the respective ceramic layers. However, when ceramic materials with different dielectric constants are used, warpageis likely to occur due to a difference in thermal expansion coefficient during sintering. For this reason, it is preferable that ceramic materials be placed symmetrically with respect to the lamination direction (e.g., in the order of material A, material B, material C, material B, and material A).

By the way, the ceramic layer 4 corresponds to the ceramic layer of the present invention, the means including the inner electrodes 2 and inter-layer via holes 3 corresponds to the electrode layer of the present invention, the laminated body 1 corresponds to the laminated body of the present invention and the reinforcement electrode 40 corresponds to the plane type inner part of the present invention.

(Embodiment 2)

Figure 2:
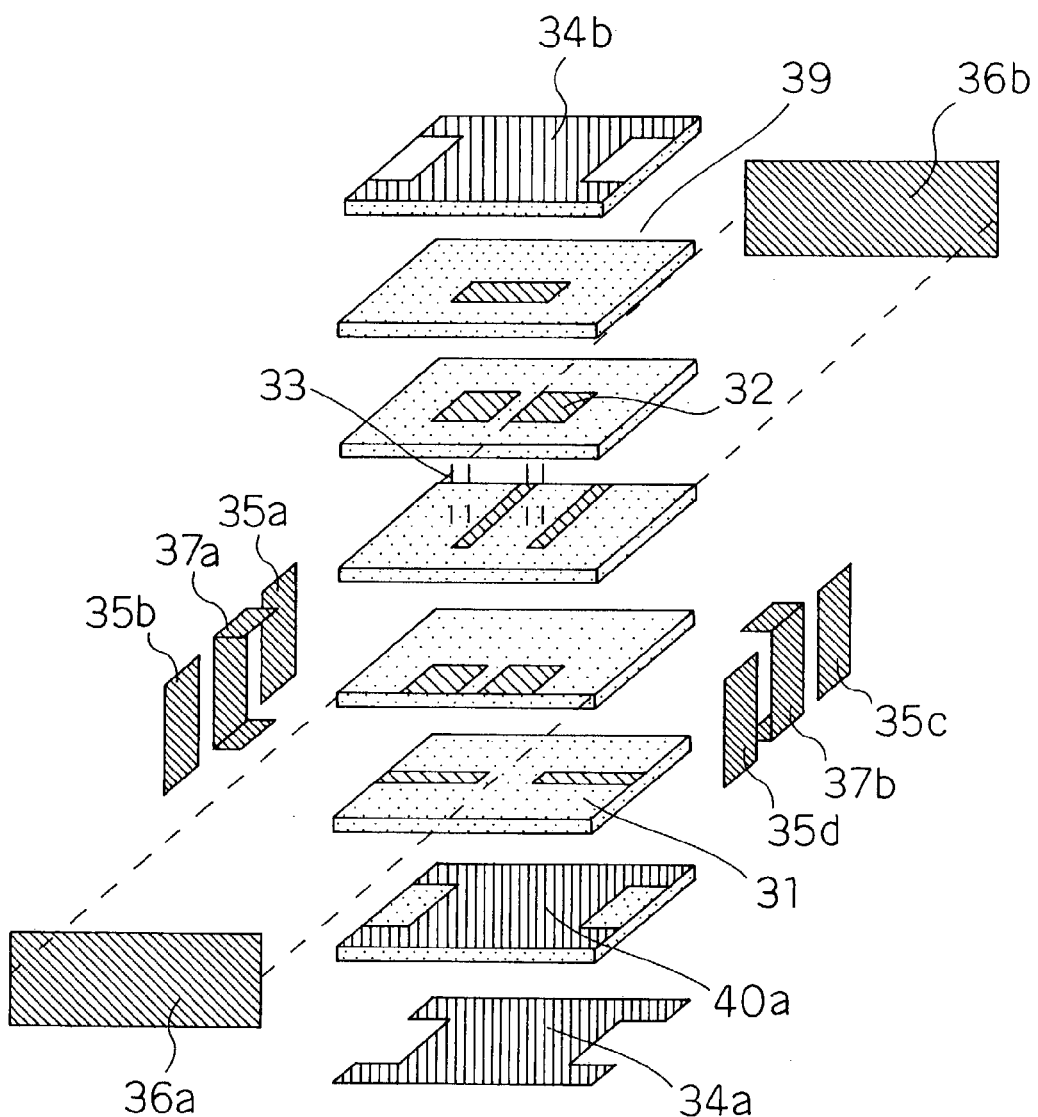
FIG. 2 is an exploded perspective view of a ceramic laminated device according to Embodiment 2 of the present invention.

With reference to FIG. 2, the configuration and operation of a ceramic laminated device according to this embodiment will be explained.

FIG. 2 is an exploded perspective view of the ceramic laminated device according to Embodiment 2 of the present invention.

The ceramic laminated device of this embodiment has a laminated body with electrode patterns 32 formed on the surface of 6 ceramic layers 31.

The electrode patterns 32 are electrically connected by means of inter-layer via holes 33.

Shield electrodes 34a and 34b are formed on the top and bottom surfaces of the laminated body to keep it shielded from the outside.

End electrodes 35a to 35d and 36a and 36b which are connected with the shield electrodes 34a and 34b to form grounding terminals and terminal electrodes 37a and 37b which form input/output terminals for inputting/outputting electric signals to/from the outside are formed on the right and left end faces of the laminated body.

A feature of the ceramic laminated device of this embodiment is seen near the bottom of the laminated body of the ceramic layers 31.

More specifically, a reinforcement electrode 40a for reinforcing the contact with the layer right above is placed on the top surface of the bottom layer of the laminated body 1 of the ceramic layers 31. The reinforcement electrode 40a has the same shape as that of the shield electrodes 34a and 34b.

In this way, it is possible to improve the bonding strength of the ceramic layers 31 constituting the laminated body, and it was proved through a reliability test including a drop test that the configuration according to this embodiment had excellent stress resistance and reliability.

(I) In addittion, similar effects can also be obtained with respect to the number of electrodes, shape and thickness.

The ceramic layers 31 correspond to the ceramic layers of the present invention. The means including the electrode patterns 32 and inter-layer via holes 33 corresponds to the electrode layer of the present invention. The shield electrodes 34a and 34b correspond to the shield electrodes of the present invention and the reinforcement electrode 40 a corresponds to the plane type inner part of the present invention.

(Embodiment 3)

Figure 3:
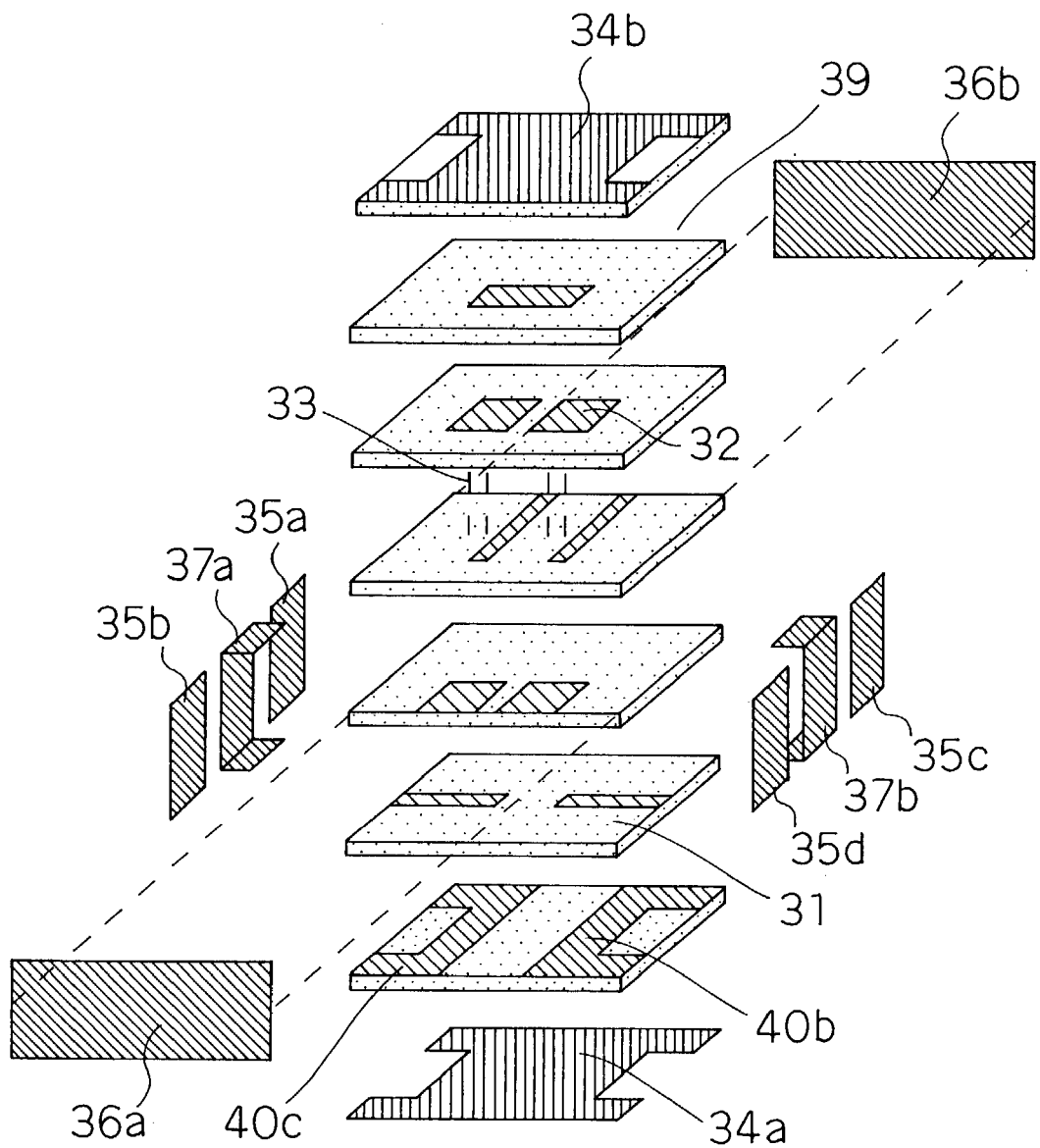
FIG. 3 is an exploded perspective view of a ceramic laminated device according to Embodiment 3 of the present invention.

With reference to FIG. 3, the configuration and operation of a ceramic laminated device according to this embodiment will be explained.

FIG. 3 is an exploded perspective view of the ceramic laminated device according to Embodiment 3 of the present invention.

A feature of a ceramic laminated device of this embodiment is seen near the bottom of the laminated body of the ceramic layers 31 (the rest of the configuration is the same as that of the ceramic laminated device of aforementioned Embodiment 2, and therefore detailed explanations thereof will be omitted).

More specifically, reinforcement electrodes 40b and 40c for reinforcing the contact with the layer right above are placed on the top surface of the bottom layer of the laminated body of the ceramic layers 31. The reinforcement electrodes 40b and 40c have a different shape from that of the shield electrodes 34a and 34b.

In this way, it is possible to improve the bonding strength of the ceramic layers 31 constituting the laminated body, and it was proved through a reliability test including a drop test that the configuration according to this embodiment had excellent stress resistance and reliability.

Figure 4:
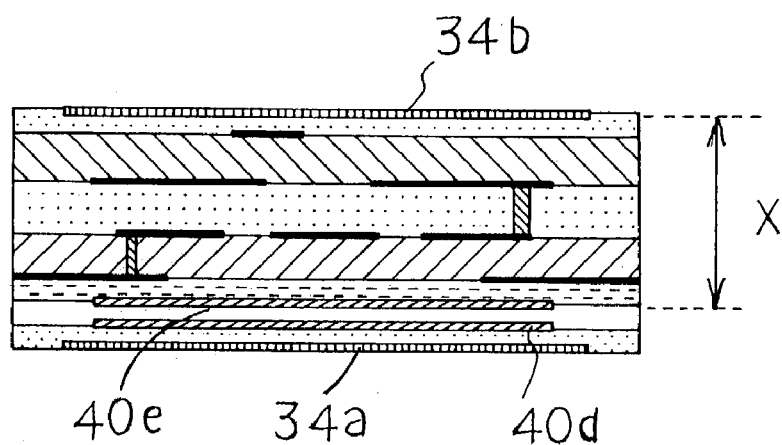
FIG. 4 is a sectional view of the ceramic laminated device according to the embodiment of the present invention.
Figure 5:
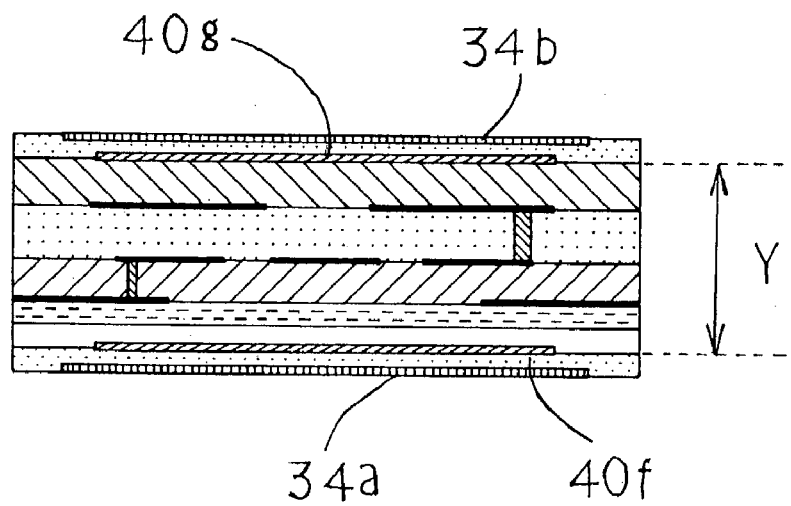
FIG. 5 is a sectional view of the ceramic laminated device according to the embodiment of the present invention.

(I) In Embodiments 1 to 3, the number of ceramic layers on which the reinforcement electrode is placed is one, but the number is not limited to one, and there may be two or more such ceramic layers (see FIGS. 4 and 5).

However, increasing the number of ceramic layers where such a reinforcement electrode is used has a tendency to shorten an electrical distance between upper and lower shield electrodes.

For example, in FIG. 4, since reinforcement electrodes 40d and 40e are used, the electrical distance between the shield electrodes 34a and 34b becomes distance X. Furthermore, in FIG. 5, since reinforcement electrodes 40f and 40g are used, the electrical distance between shield electrodes 34a and 34b becomes distance Y.

For this reason, when there are too many ceramic layers where reinforcement electrodes are used, the characteristic of the high frequency circuit formed inside the laminated body may deteriorate. Therefore, there are preferably not too many ceramic layers where the reinforcement electrodes are used.

However, as in the case of aforementioned Embodiment 3, when the reinforcement electrodes have a shape different from that of the shield electrodes, providing a gap in the center of the reinforcement electrode (that is, a place where there is no electrode printing) will prevent the electrical distance between the upper and lower shield electrodes from shortening.

Of course, as in the case of aforementioned Embodiment 2, when the reinforcement electrodes have the same shape as that of the shield electrodes, there is an advantage that the manufacturing process is simpler.

(II) Furthermore, when the reinforcement electrodes are arranged symmetrically with respect to the lamination direction, warpage is unlikely to occur due to a difference in thermal expansion coefficient during sintering, and therefore preferable effects can be expected (see FIG. 5).

The ceramic layers 31 correspond to the ceramic layers of the present invention. The means including the electrode patterns 32 and inter-layer via holes 33 corresponds to the electrode layer of the present invention. The shield electrodes 34a and 34b correspond to the shield electrodes and the reinforcement electrodes 40b and 40c correspond to the plane type inner parts of the present invention.

(Embodiment 4)

Figure 6:
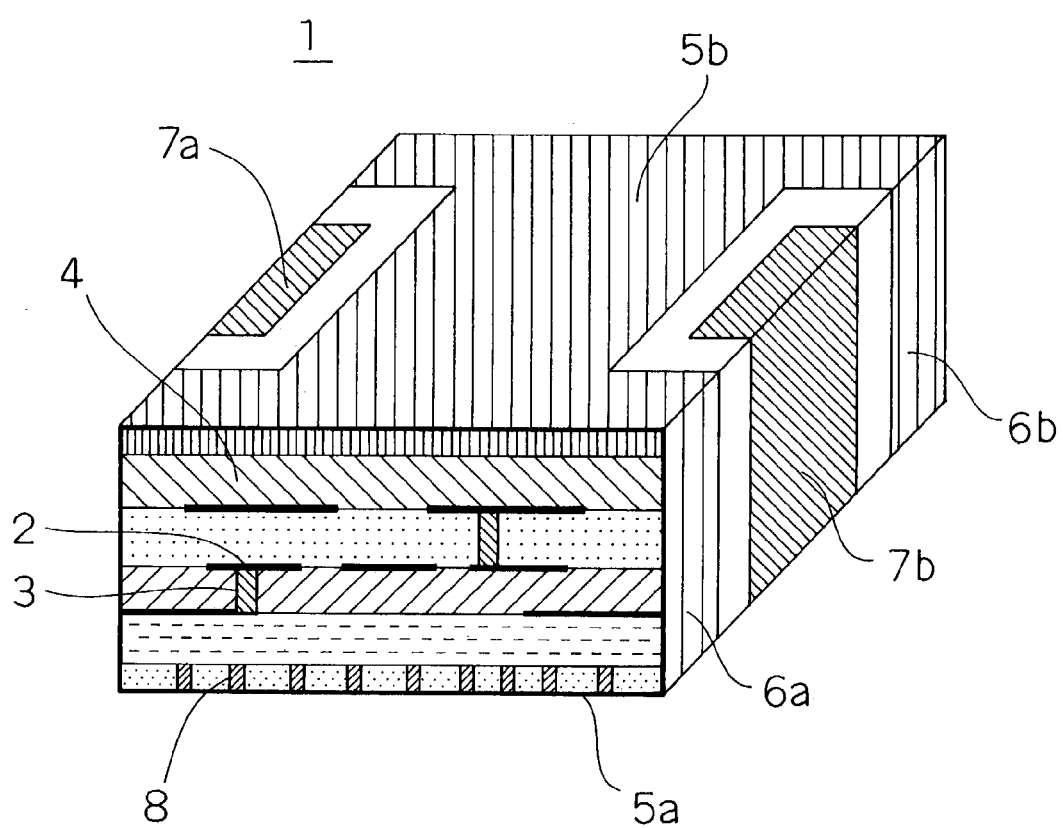
FIG. 6 is a schematic perspective view of a ceramic laminated device according to Embodiment 4 of the present invention.

With reference to FIG. 6, the configuration and operation of a ceramic laminated device of this embodiment will be explained.

FIG. 6 is a schematic perspective view of the ceramic laminated device according to Embodiment 4 of the present invention.

A feature of the ceramic laminated device of this embodiment is seen near a shield electrode 5a formed below a laminated body 1 (the rest of the configuration is the same as the configuration of the ceramic laminated device of Embodiment 1, and therefore detailed explanations thereof will be omitted).

More specifically, in the layer at the bottom of the laminated body 1 of ceramic layer 4 are placed a plurality of via holes 8 whose one end is mechanically connected with the shield electrode 5a formed on the underside of the laminated body 1 and whose other end is electrically open.

The via holes 8 are formed by filling holes penetrating the ceramic layer 4, which constitutes the laminated body 1, with a conductive paste (or dielectric paste) and sintering them. The via holes 8 are via holes intended to secure the contact between the ceramic layer 4 and the shield electrode 5a.

In this way, it is possible to improve the bonding strength of the ceramic layer 4 constituting the laminated body 1 and the shield electrode 5a, and it was proved through a reliability test including a drop test that the configuration according to this embodiment had excellent stress resistance and reliability.

More specifically, in such a reliability test, there was neither peeling from the printed circuit board, cracks in the end electrodes 6a and 6b and terminal electrodes 7a and 7b, nor cracks in the laminated body 1.

The laminated body 1 actually built as a prototype of this embodiment has dimensions of breadth 8.5 mm×depth 4.5 mm×height 2.0 mm.

In the shield electrode 5a, which is the underside of the laminated body 1, 15 via holes 8 of 140 μm in length whose one end is connected to the shield electrode 5a and whose other end is open, are placed virtually equidistantly.

Five laminated bodies 1 of this embodiment and five conventional laminated bodies were each soldered equidistantly to a printed circuit board.

When a drop test was conducted, most of the conventional laminated bodies had defects like laminated body peeling from the printed circuit board or cracks, whereas none of the five laminated bodies 1 of this embodiment had such defects.

Therefore, it was observed that reliability improved drastically and sufficient effects were obtained.

The ceramic layer 4 corresponds to the ceramic layer of the present invention. The means including the inner electrodes 2 and inter-layer via holes 3 corresponds to the electrode layer of the present invention. The laminated body 1 corresponds to the laminated body of the present invention, and the shield electrodes 5a and 5b correspond to the shield electrodes of the present invention. The via holes 8 correspond to the via holes provided in the ceramic layer to which the shield electrodes of the present invention are pasted.

(Embodiment 5)

Figure 8:
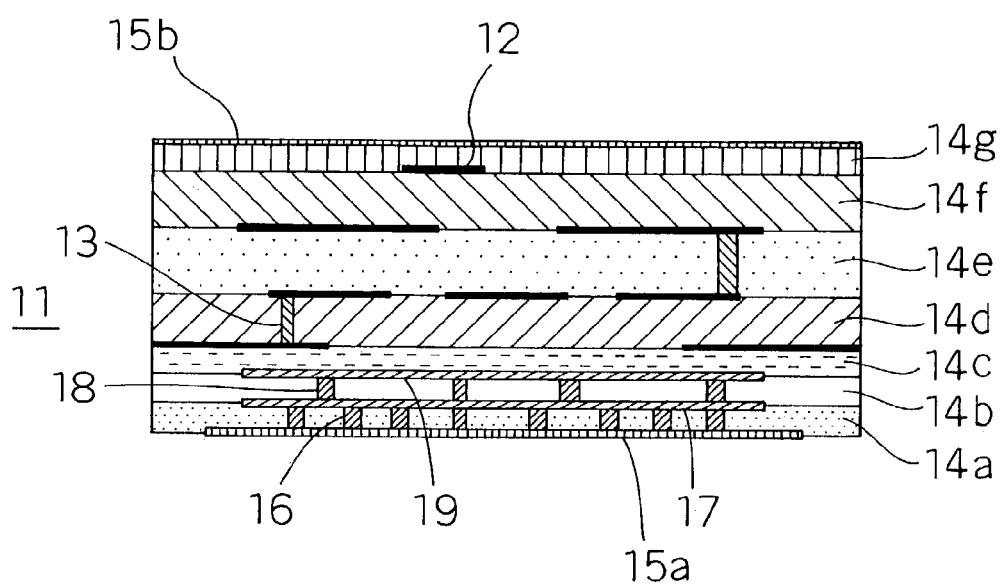
FIG. 8 is a sectional view of a ceramic laminated device according to Embodiment 5 of the present invention.

With reference to FIG. 8, the configuration and operation of a ceramic laminated device according to this embodiment will be explained.

FIG. 8 is a sectional view of the ceramic laminated device according to Embodiment 5 of the present invention.

The ceramic laminated device of this embodiment has a laminated body 11.

Inner electrodes 12 constituting a high frequency circuit are built in the laminated body 11.

The inner electrodes 12 are mutually electrically connected through inter-layer via holes 13.

The inter-layer via holes 13 are formed by filling holes penetrating the ceramic layers 14a to 14g constituting the laminated body 11 with a conductive paste predominantly composed of silver or copper and sintering them.

Shield electrodes 15a and 15b are formed on the top and bottom surfaces of the laminated body 11 to keep it shielded from the outside.

As in the case of aforementioned Embodiment 1, terminal electrodes (not shown) and end electrodes (not shown) are formed on the end faces of the laminated body 11.

On the upside of the first ceramic layer 14a at the bottom is placed a plane type first via connection electrode 17, which does not function as a circuit element.

On the upside of the second ceramic layer 14b is placed a plane type second via connection electrode, 19 which does not function as a circuit element.

The first ceramic layer 14a at the bottom of the laminated body 11 is provided with a plurality of first via holes 16 to mechanically connect a shield electrode 15a formed on the underside of the laminated body 11 and a first via connection electrode 17.

The second ceramic layer 14b on top of the first via connection electrode is provided with a plurality of second via holes 18 to mechanically connect the first via connection electrode 17 and the second via connection electrode 19.

The first via holes 16 are formed by filling holes penetrating the ceramic layers constituting the laminated body 11 with a conductive paste (or dielectric paste) and sintering them. The first via holes 16 are via holes intended to secure the contact between the first via connection electrode 17 and the shield electrode 15a.

The second via holes 18 are formed by filling holes penetrating the ceramic layers constituting the laminated body 11 with a conductive paste (or dielectric paste) and sintering them. The second via holes 18 are via holes intended to secure the contact between the second via connection electrode 19 and the first via connection electrode 17.

In this way, it is possible to improve the bonding strength of the ceramic layers 14a and 14b and the shield electrode 15a, and it was proved through a reliability test including a drop test that the configuration according to this embodiment had excellent stress resistance and reliability.

(I) The number of via connection electrodes to improve the bonding strength in this embodiment is 2. The number of electrodes is not limited to this, and the number of the via connection electrode can also be 1 (see FIG. 7) or 3 or more.

However, increasing the number of via connection electrodes has a tendency to shorten an electrical distance between upper and lower shield electrodes.

Figure 7:
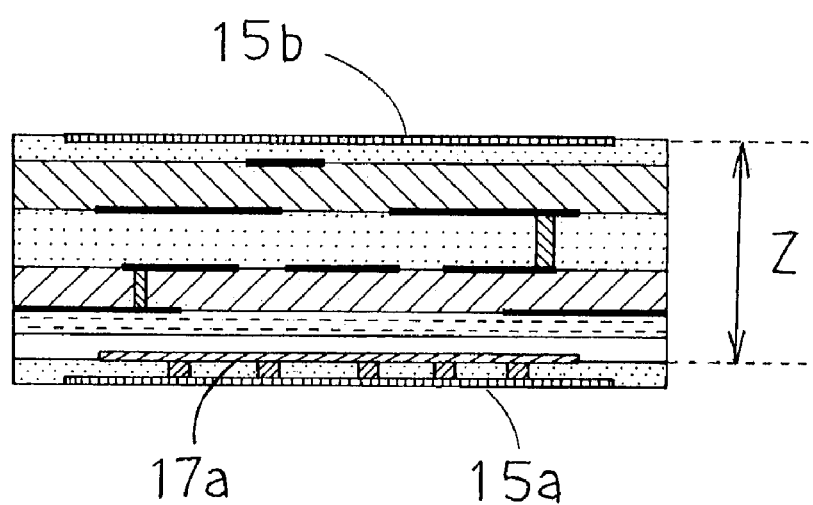
FIG. 7 is a sectional view of the ceramic laminated device according to the embodiment of the present invention.

For example, in FIG. 7, since the via connection electrode 17a is placed, the electrical distance between the shield electrodes 15a and 15b becomes distance Z.

For this reason, when there are too many via connection electrodes the characteristic of the high frequency circuit formed inside the laminated body may deteriorate. Therefore, there are preferably not too many via connection electrodes.

(II) Furthermore, when the via connection electrodes are arranged symmetrically with respect to the lamination direction, warpage is unlikely to occur due to a difference in thermal expansion coefficient during sintering, and therefore preferable effects can be expected.

The ceramic layers 14a to 14g correspond to the ceramic layers of the present invention, the means including the inner electrodes 12 and inter-layer via holes 13 corresponds to the electrode layers of the present invention, the laminated body 11 corresponds to the laminated body of the present invention, the shield electrodes 15a and 15b correspond to the shield electrodes of the present invention, the first via connection electrode 17 and second via connection electrode 19 correspond to the plane type inner parts of the present invention, the first via holes 16 correspond to the via holes provided in the ceramic layer between the shield electrode and plane type inner part of the present invention, the second via holes 18 correspond to the via holes provided in the ceramic layer between a plurality of plane type inner parts of the present invention (at least some of the via holes are provided in the ceramic layer 14b between the first via connection electrode 17 and the second via connection electrode 19 in the ceramic layers 14a to 14g).

(Embodiment 6)

Figure 9:
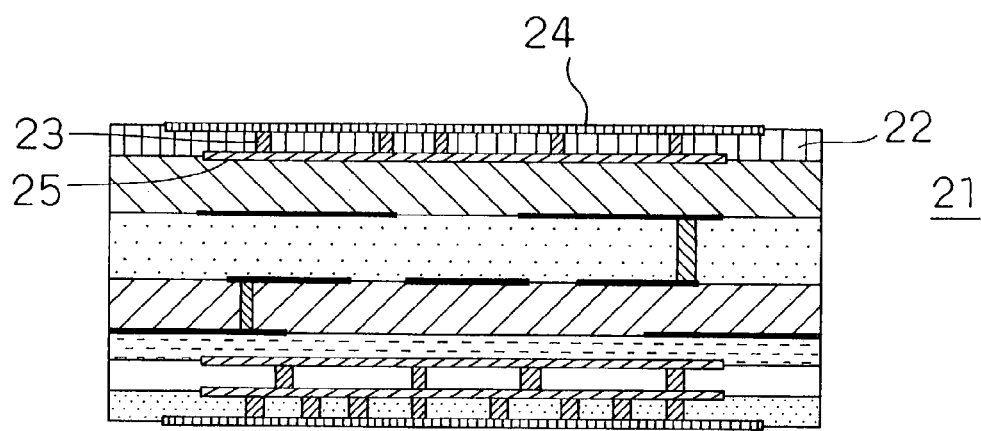
FIG. 9 is a sectional view of a ceramic laminated device according to Embodiment 6 of the present invention.

With reference to FIG. 9, the configuration and operation of a ceramic laminated device of this embodiment will be explained.

FIG. 9 is a sectional view of the ceramic laminated device according to Embodiment 6 of the present invention.

A feature of the ceramic laminated device of this embodiment is seen near the upper part of a laminated body 21 (the rest of the configuration is similar to the configuration of the ceramic laminated device according to Embodiment 5, and therefore detailed explanations thereof will be omitted).

More specifically, on the underside of the ceramic layer 22 located at the top is further placed a plane type third via connection electrode 25, which does not function as a circuit element.

In the ceramic layer 22 located at the top of the laminated body 21 are placed a plurality of third via holes 23 to mechanically connect a shield electrode 24 formed on the upside of the laminated body 21 and the third via connection electrode 25.

The third via holes 23 are formed by filling holes penetrating the ceramic layers constituting the laminated body 21 with a conductive paste (or dielectric paste) and sintering them. The third via holes 23 are via holes intended to secure the contact between the third via connection electrode 25 and shield electrode 24.

In this way, it is possible to provide a ceramic laminated device with excellent reliability.

More specifically, when a semiconductor element, semiconductor package, SAW filter and discrete component are mounted on the laminated body 21, it is possible to reinforce bonding strength between the ceramic layer 22 and the shield electrode 24 thereupon. Here, in the case of a semiconductor element, a stack bump bonding (SBB) method, etc. may be used as the mounting method.

By the way, the ceramic layer 22 corresponds to the ceramic layer of the present invention, the laminated body 21 corresponds to the laminated body of the present invention, the shield electrode 24 corresponds to the shield electrode of the present invention, the third via connection electrode 25 corresponds to the plane type inner part of the present invention and the third via holes 23 correspond to the via holes provided in the ceramic layer between the shield electrode and plane type inner part of the present invention.

(Embodiment 7)

Figure 10:
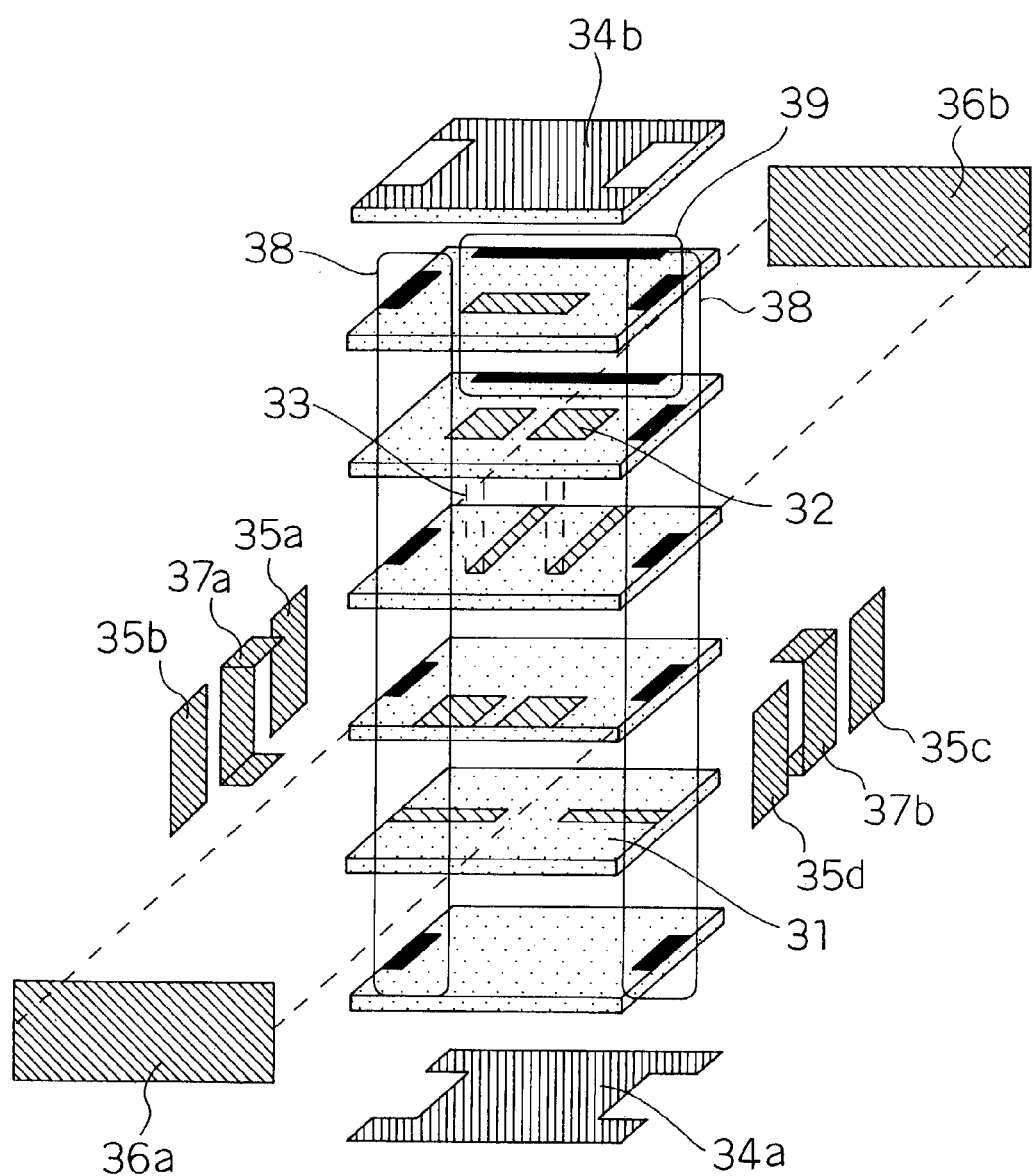
FIG. 10 is an exploded perspective view of a ceramic laminated device according to Embodiment 7 of the present invention.

With reference to FIG. 10, the configuration and operation of a ceramic laminated device according to this embodiment will be explained.

FIG. 10 is an exploded perspective view of the ceramic laminated device according to Embodiment 7 of the present invention.

A feature of the ceramic laminated device of this embodiment is seen near the surface of a plurality of ceramic layers 31 (the rest of the configuration is the same as the configuration of the ceramic laminated device of Embodiment 2, and therefore detailed explanations thereof will be omitted).

More specifically, on the surface of a plurality of ceramic layers 31 are placed first inner electrodes 38 that do not function as a circuit element (enclosed by a rectangle with round corners for ease of understanding). The first inner electrodes 38 are provided substantially perpendicular to the terminal electrodes 37a and 37b that form input/output terminals to input/output electric signals to/from the outside and mechanically connected with the terminal electrodes 37a and 37b.

On the surface of the plurality of ceramic layers 31 are placed second inner electrodes 39 that do not function as a circuit element (enclosed by a rectangle with round corners for ease of understanding). The second inner electrode 39 is provided substantially perpendicular to the end electrode 36b that connects the shield electrodes 34a and 34b and mechanically connected with the end electrode 36b.

Thus, there is a drastic increase in the number of connections between the first inner electrodes 38 and terminal electrodes 37a and 37b and connections between the second inner electrode 39 and end electrode 36b. This drastically increases the bonding strength between the laminated body and external electrodes consisting of the terminal electrodes 37a and 37b and end electrode 36b, etc.

In this way, it is possible to prove through a reliability test including a drop test that the configuration according to this embodiment has excellent reliability and provide a ceramic laminated device with high stress resistance.

The laminated body actually built as a prototype of this embodiment has dimensions of breadth 8.5 mm×depth 4.5 mm×height 2.0 mm.

8 first inner electrodes 38 are connected with the terminal electrodes 37a and 37b formed on the surface of the laminated body.

When the terminal electrodes 37a and 37b had a width of 1.0 mm and the first inner electrode 38 having a depth of 0.5 mm was connected thereto, there were no longer defects such as peeling from the printed circuit board or cracks during a drop test.

Therefore, it was confirmed that reliability was improved drastically and sufficient effects were obtained.

The ceramic layers 31 correspond to the ceramic layers of the present invention. The means including the electrode patterns 32 and inter-layer via holes 33 corresponds to the electrode layers of the present invention. The terminal electrodes 37a and 37b correspond to the terminal electrodes of the present invention. The first inner electrodes 38 correspond to the plane type inner parts connected to the terminal electrodes of the present invention and the shield electrode 34b corresponds to the upside shield electrode of the present invention. The shield electrode 34a corresponds to the underside shield electrode of the present invention, the end electrodes 35a to 35d and 36a and 36b correspond to the end electrodes of the present invention and the second inner electrode 39 corresponds to the plane type inner part connected to end electrodes of the present invention.

(Embodiment 8)

Figure 11:
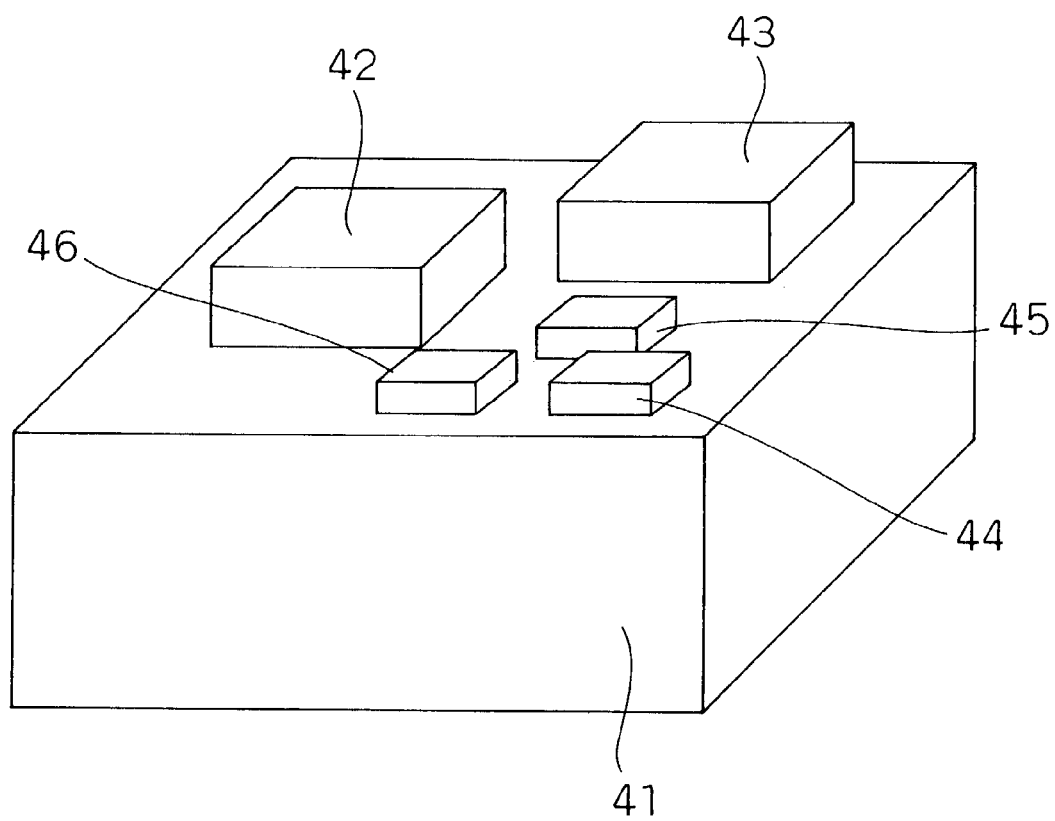
FIG. 11 is a perspective view of a ceramic laminated device according to Embodiment 8 of the present invention.

With reference to FIG. 11, the configuration and operation of a ceramic laminated device according to this embodiment will be explained.

FIG. 11 is a perspective view of the ceramic laminated device according to Embodiment 8 of the present invention.

On the upside of a laminated body 41 of the ceramic laminated device of this embodiment, a semiconductor element 42, a SAW filter 43, a PIN diode 44, a chip capacitor 45 and a chip resistor 46 are mounted.

More specifically, for example, the semiconductor element 42 is a transistor such as a low noise amplification circuit mounted on the surface of the laminated body 41 and electrically connected with a high frequency circuit formed inside the laminated body 41 through a connection electrode formed on the surface of the laminated body 41. Here, the high frequency circuit is a laminated filter, etc.

A circuit element such as the semiconductor element 42 can be united with the circuit elements such as a capacitor and inductor formed inside and on the surface of the laminated body 41. Thus, the present invention is expected to contribute to the miniaturization of a cellular phone with more sophisticated functions.

Using the aforementioned ceramic laminated device according to Embodiments 1 to 7 as the laminated body 41 can provide a high reliability ceramic laminated device. Furthermore, it can also improve yield in the manufacturing stage.

The laminated body 41 corresponds to the laminated body of the present invention. The circuit including the semiconductor element 42 corresponds to the semiconductor element of the present invention. The SAW filter 43 corresponds to the SAW filter of the present invention.

(Embodiment 9)

Figure 12:
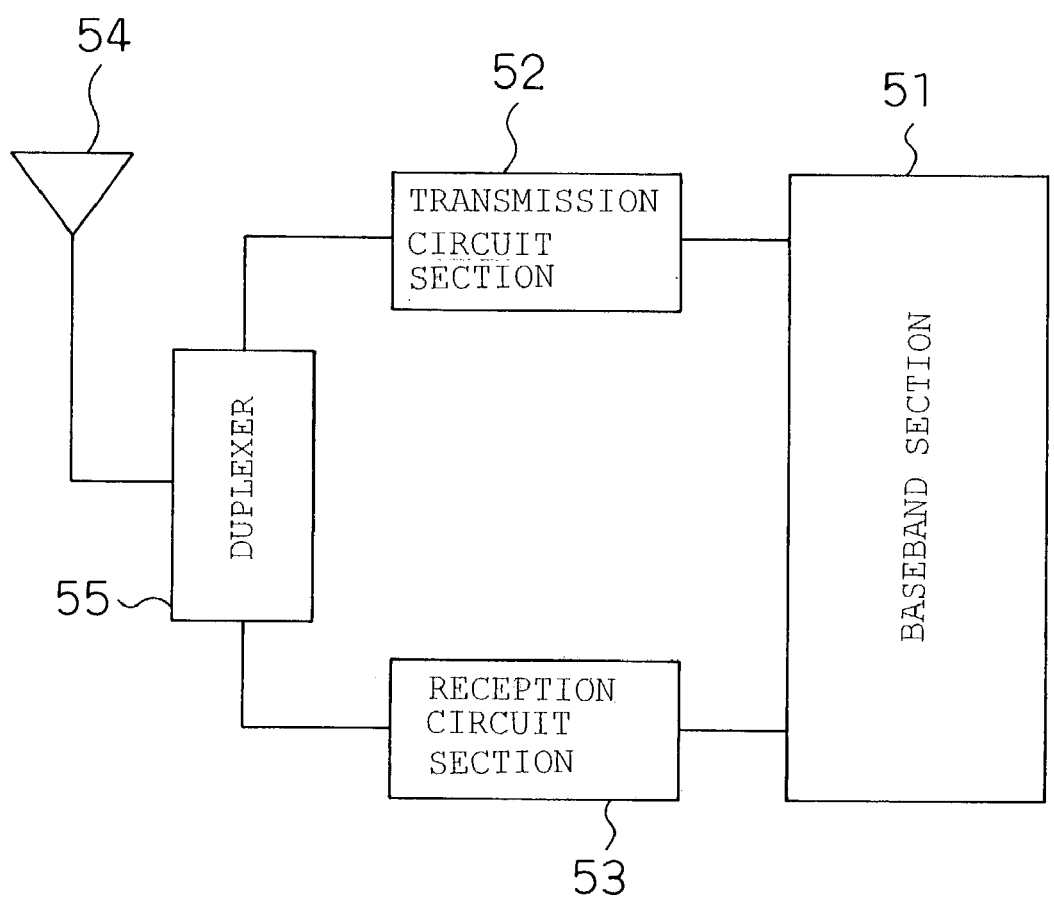
FIG. 12 is a block diagram of a W-CDMA cellular phone according to Embodiment 9 of the present invention.
Figure 13:
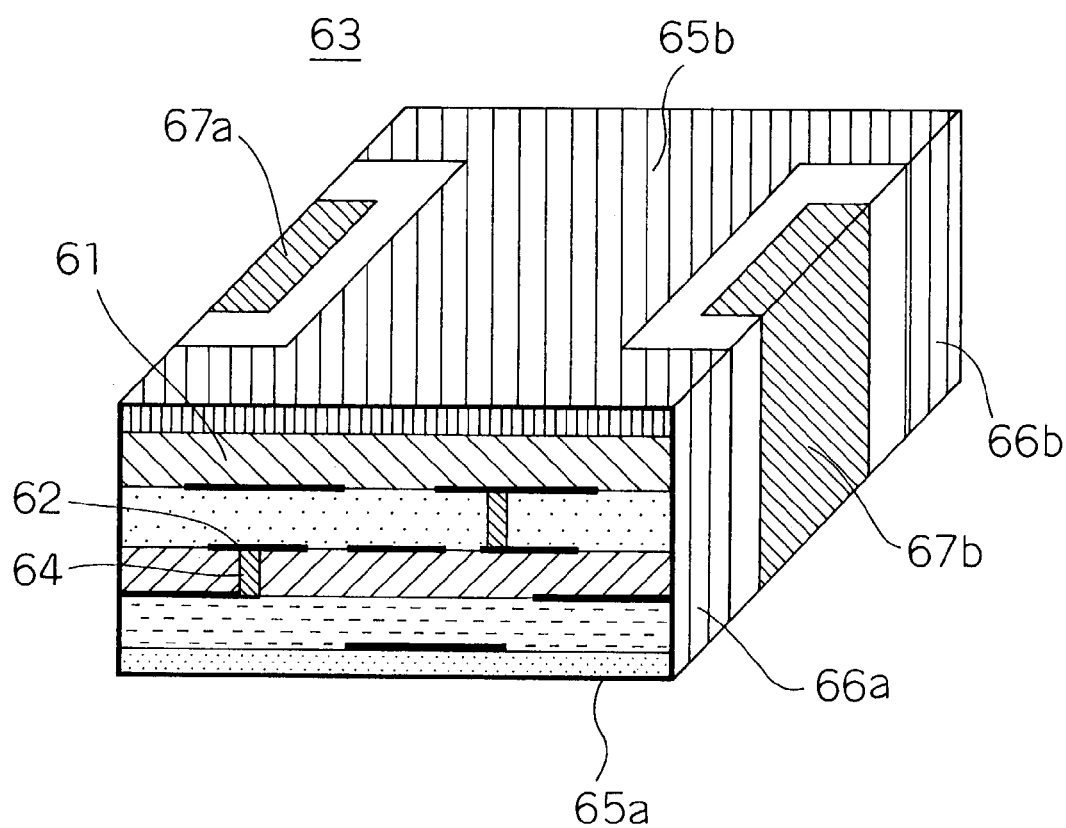
FIG. 13 is a schematic perspective view of a conventional ceramic laminated device.

With reference to FIG. 12, the configuration and operation of a W-CDMA (Wideband-Code Division Multiplex Access) cellular phone according to this embodiment will be explained.

FIG. 12 is a block diagram of the W-CDMA cellular phone according to Embodiment 9 of the present invention.

For the W-CDMA cellular phone of this embodiment, the ceramic laminated device of the aforementioned embodiment is used.

A signal output from the baseband section 51 is input to the transmission circuit section 52 and output as a signal with a transmission frequency.

On the other hand, a signal with a reception frequency led from an antenna 54 is input to the reception circuit section 53, converted in the reception circuit section 53 from a signal with a reception frequency to a signal with a frequency of the baseband section 51 and output to the baseband section 51.

A duplexer 55 has the function of separating a transmission signal and reception signal.

Using the ceramic laminated device of the aforementioned embodiment can realize a high reliability cellular phone.

(I) This embodiment uses a duplexer used for a W-CDMA cellular phone, but it is also possible to use a duplexer used in other cellular phone systems such as GSM (Global System for Mobile Communication) system and PDC (Personal Digital Cellular) system.

(II) Furthermore, the ceramic laminated device can also have functions other than that of the duplexer.

The duplexer 55 corresponds to the duplexer of the present invention and the means including the baseband section 51, transmission circuit section 52 and reception circuit section 53 corresponds to the communication circuit of the present invention.

Embodiments 1 to 9 have been explained in detail so far.

The ceramic layer provided with the shield electrodes according to the present invention, for example, of Embodiment 4 above, is provided with penetrating via holes 8 filled with a conductive paste (or dielectric paste), but the present invention is not limited to this and via holes provided at least on the plane of the shield electrode can make the same effect (such via holes may or may not penetrate the ceramic layer). In short, any ceramic layer provided with the shield electrode of the present invention is acceptable if it is at least provided with a solid inner part substantially perpendicular to the ceramic layer on the plane of the shield electrode.

Furthermore, the ceramic layer provided with the via holes of the present invention, for example, of Embodiment 4 above, is the shield electrode 5a formed on the underside of the laminated body, but the ceramic layer is not limited to this. In short, any ceramic layer is acceptable if it is at least provided with the shield electrode formed on the upside and/or underside of the laminated body.

Furthermore, the plane type inner part connected to the terminal electrodes of the present invention, for example, of Embodiment 7, is the first inner electrode 38 connected to the terminal electrodes 37a and 37b, but the plane type inner part is not limited to this. In short, any plane type inner part is acceptable if it is mechanically connected with a whole or part of the terminal electrode.

Furthermore, the plane type inner part connected to the end electrodes of the present invention, for example, of Embodiment 7, is the second inner electrode 39 connected to the end electrode 36b, but the plane type inner part is not limited to this. In short, any plane type inner part is acceptable if it is mechanically connected with a whole or part of the end electrode.

Thus, by directly connecting (1) electrodes, (2) via holes and (3) shield electrodes, terminal electrodes and end electrodes formed inside the laminated body that constitute the ceramic laminated device, it is possible to improve the bonding strength between the laminated body and the external electrodes.

Then, it is possible to provide a ceramic laminated device with secured reliability supported by excellent results of various reliability tests such as drop test, ensuring no peeling from the printed circuit board nor cracks in the laminated body.

As is apparent from the explanations above, the present invention has the advantage of providing a ceramic laminated device capable of securing reliability while maintaining favorable high frequency characteristics.

What is claimed is:

1. A ceramic laminated device comprising an inner part formed inside a laminated body in which a plurality of ceramic layers and a plurality of electrode layers are stacked, wherein the device includes a top and a bottom, and further includes a first electrode layer on the top of the device and a second electrode layer on the bottom of the device, wherein said inner part comprises a reinforcement electrode having the same shape and dimensions as one of the first and second electrode layers, and wherein the reinforcement electrode is in direct contact with both the first and the second ceramic layers from the bottom of the device.

2. The ceramic laminated device according to claim 1, wherein said inner part is a single or a plurality of plane type inner parts provided substantially in parallel to said ceramic layer.

3. The ceramic laminated device according to claim 2, further comprising shield electrodes formed on the upside and/or underside of said laminated body,
wherein said plane type inner part has the same shape as that of said shield electrodes.

4. The ceramic laminated device according to claim 1, further comprising shield electrodes formed on the upside and/or underside of said laminated body,
wherein said inner part further comprises a single or a plurality of solid inner parts provided substantially perpendicular to said ceramic layers on the plane on the side of at least said shield electrodes of said ceramic layers to which said shield electrodes are pasted.

5. The ceramic laminated device according to claim 2, further comprising shield electrodes formed on the upside and/or underside of said laminated body, wherein said inner parts are (i) said plane type inner parts, and (ii) a single or a plurality of solid inner parts provided substantially perpendicular to said ceramic layers in said ceramic layers between said shield electrodes and said plane type inner parts.

6. The ceramic laminated device according to claim 5, wherein a plurality of said plane type inner parts are provided, at least some of said solid inner parts are provided in said ceramic layer between said plane type inner parts.

7. The ceramic laminated device according to any one of claims 4 to 6, wherein said solid inner part is a via hole filled with a conductive paste or dielectric paste.

8. The ceramic laminated device according to claim 1, further comprising: side electrodes formed on a side of the laminated body; and the inner part, being not electrically connected with said electrode layers but mechanically connected with said side electrodes.

9. The ceramic laminated device according to claim 8, wherein said side electrodes are terminal electrodes formed on end faces of said laminated body for inputting/outputting electric signals to/from the outside, and said inner part is a plane type inner part mechanically connected with a whole or part of said terminal electrodes and provided substantially in parallel to said ceramic layer.

10. The ceramic laminated device according to claim 8, further comprising an upside shield electrode formed on the upside of said laminated body, and an underside shield electrode formed on the underside of said laminated body, wherein said side electrodes are end electrodes formed on end faces of said laminated body for electrically connecting said upside shield electrode and said underside shield electrode, and said inner part is a plane type inner part mechanically connected with a whole or part of said end electrodes and provided substantially in parallel to said ceramic layer.

11. The ceramic laminated device according to claim 1 or 8, wherein a semiconductor element and/or SAW filter are mounted on the upside of said laminated body.

12. The ceramic laminated device according to claim 1 or 8, wherein said laminated body incorporates a filter.

13. The ceramic laminated device according to claim 12, wherein said filter has the function as a duplexer having a transmission filter function to transmit signals and a reception filter function to receive signals.

14. Communication equipment comprising: communication circuits that carries out a communication using transmission and/or reception of signals; and the ceramic laminated device according to claim 1 or 9 that carries out filtering during said communication.

* * * * *